United States Patent [19]
Prigent

[11] Patent Number: 6,151,087
[45] Date of Patent: *Nov. 21, 2000

[54] LIQUID CRYSTAL DISPLAY HAVING A LIGHT SOURCE THROUGH AN OPENING OF A REFLECTIVE FILM COVERING A SIDE EDGE OF A SUBSTRATE

[75] Inventor: Georges Prigent, Le Mans, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/097,973

[22] Filed: Jun. 16, 1998

[30] Foreign Application Priority Data

Jun. 20, 1997 [FR] France ................................. 97 07724

[51] Int. Cl.[7] .............................. G02F 1/1335; F21V 7/04
[52] U.S. Cl. .................................. 349/65; 349/67; 362/31
[58] Field of Search ................................. 349/65, 62, 61, 349/67; 362/31

[56] References Cited

U.S. PATENT DOCUMENTS

| | | | |
|---|---|---|---|
| 4,011,001 | 3/1977 | Moriya | 350/160 |
| 4,659,183 | 4/1987 | Suzawa | 350/345 |
| 5,729,311 | 3/1998 | Broer et al. | 349/65 |
| 5,751,386 | 5/1998 | Kanda et al. | 349/65 |
| 5,808,713 | 9/1998 | Broer et al. | 349/65 |
| 5,883,684 | 3/1999 | Millikan et al. | 349/65 |

FOREIGN PATENT DOCUMENTS

| | | |
|---|---|---|
| 5958421 | 4/1984 | Japan . |
| 1417958 | 4/1974 | United Kingdom . |

*Primary Examiner*—Walter Malinowski
*Attorney, Agent, or Firm*—Dicran Halajian

[57] ABSTRACT

The invention discloses a liquid crystal display including in succession a first polarizer, a first glass layer, a liquid crystal, a second glass layer, a second polarizer, a purely reflective reflector, a light source and a reflector film surrounding the edge of the second glass layer while preserving at least one opening for letting light pass that is emitted by the source through the glass layer. Such an arrangement provides a liquid crystal display, which has an efficient and uniform irradiance without the aid of a light guide which renders the display lighter and flatter than the conventional displays.

7 Claims, 2 Drawing Sheets

LIQUID CRYSTAL DISPLAY HAVING A LIGHT SOURCE THROUGH AN OPENING OF A REFLECTIVE FILM COVERING A SIDE EDGE OF A SUBSTRATE

FIELD OF THE INVENTION

The invention relates to a display comprising:

a ferro-electric material of the liquid crystal type sandwiched between a first and a second layer of a material that passes light, and at least one light source placed on the side of the display to light it.

The invention also relates to an electronic apparatus comprising such a display.

The invention applies to all apparatus comprising a display of the LCD type (Liquid Crystal Display) and, particularly, to radio telephones and other portable equipment with a display.

BACKGROUND OF THE INVENTION

A display of the type defined in the opening paragraph is known from patent document no. 1 417 958. It additionally comprises a light guide of which one surface is textured. The guide is placed between a polarizer and a reflector. It is illuminated on the side by the light source so that the reflection of the light wave on the textured surface produces a homogeneous illumination of the screen.

SUMMARY OF THE INVENTION

It is an object of the invention to provide a display comprising an efficient lighting system which does not need the presence of a light guide for diminishing the weight and the thickness of the display.

Therefore, an arrangement of the type already mentioned is characterized in that the edge of one of the layers of material that pass light is covered by a reflective film leaving at least one opening for letting light pass that is emitted by said source.

BRIEF DESCRIPTION OF THE INVENTION

These and other aspects of the invention will be apparent from and elucidated with reference to the embodiments described hereinafter.

In the drawings:

FIG. 3 represents

DETAILED DESCRIPTION OF THE INVENTION

Figure 1:
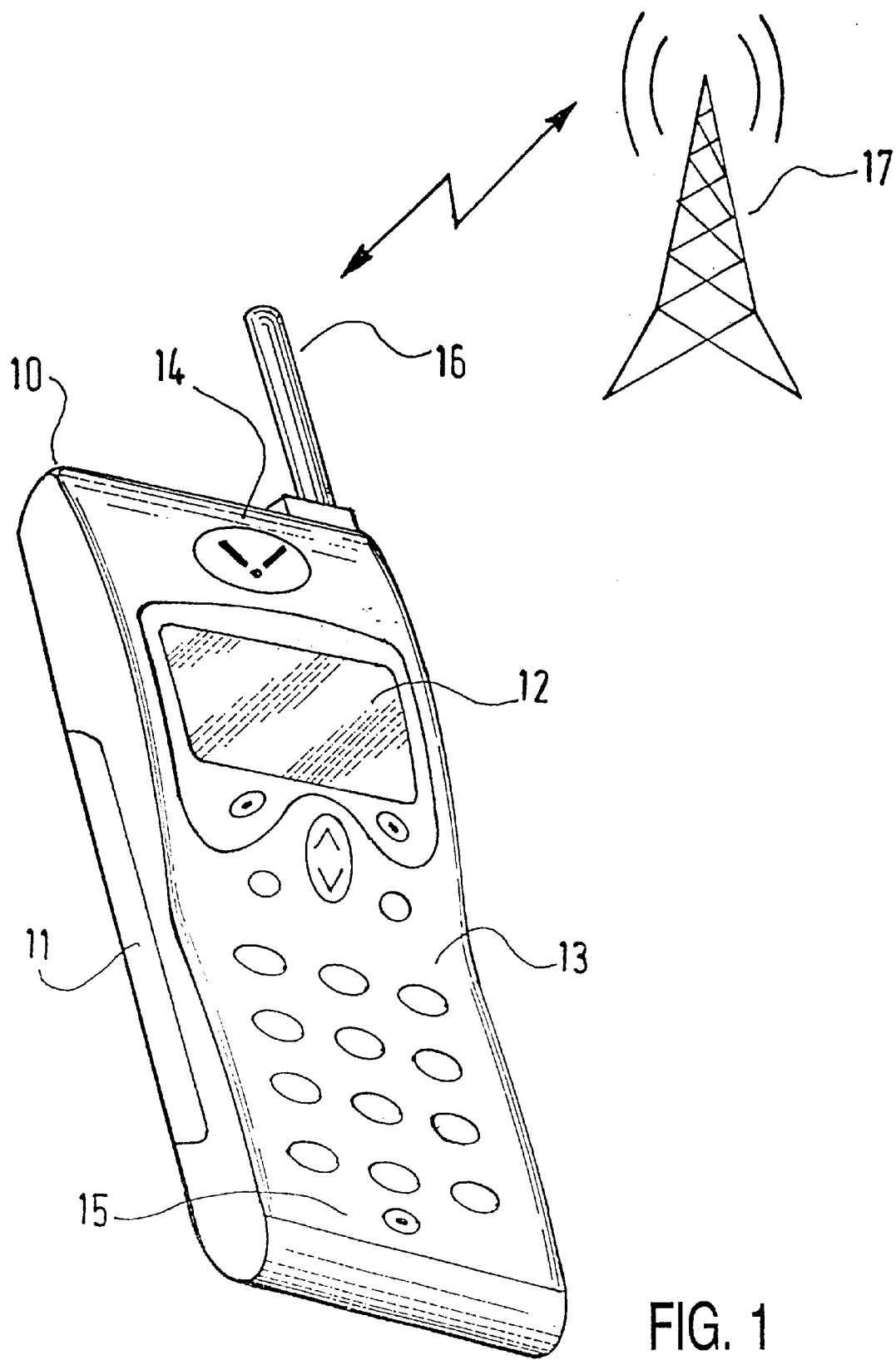
FIG. 1 represents an electronic apparatus according to the invention.

The apparatus represented in FIG. 1 is a radio telephone, but the invention may be applied to any other electronic apparatus comprising a liquid crystal display type of display.

The radio telephone represented in FIG. 1 comprises a casing 10, a supply battery 11 and electronic circuits (not shown) integrated with a board currently called PCB (Printed Circuit Board) situated inside the casing 10. A liquid crystal display 12, a keyboard 13, an earphone 14 and a microphone 15 ensure the interface with the user. A transceiver circuit also integrated with the PCB board co-operates with an antenna 16 for exchanging radio signals with a base site 17.

Figure 2:
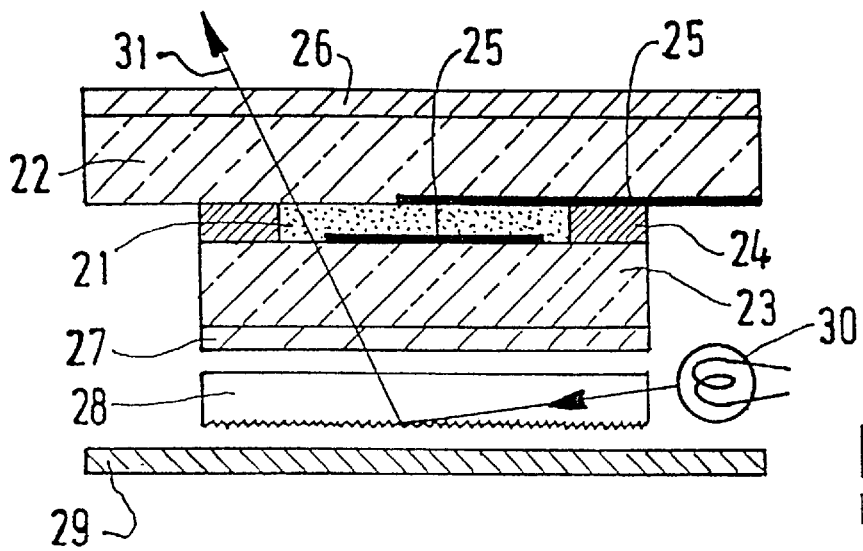
FIG. 2 represents a cross-sectional view of a display according to the prior art.

A cross-sectional view of a liquid crystal display 12 is illustrated in FIG. 2. It is formed by a liquid crystal 21 having optical properties, sandwiched between two layers of transparent glass 22 and 23 sealed by a sealing agent 24 to avoid any escape of liquid crystal 21. The optical activity of the crystal is manifested by a rotation of 90° of the polarization plane of an incident polarized light. Conducting films 25 are provided on the opposite surfaces of the glass layers 22 and 23 to be in contact with the liquid crystal 21. The assembly described above is in its turn sandwiched between a upper polarizer 26 and an lower polarizer 27 whose polarization planes form a right angle. A light guide 28 and a reflector 29 are placed behind the lower polarizer 27. The light guide 28 may be made of a translucent material for example, ground glass. A light source 30, for example, a pointed light source is placed by the side of the assembly near to the light guide 28 for directly lighting it through the edge.

When the source is placed, for example, against the edge of the light guide 28, the emitted light ray 31 is propagated throughout the guide 28 by a phenomenon of diffusion due to its textured surface and is then reflected by the reflector 29 to light the whole display.

The present invention proposes to provide a lighter and a thinner display than that described previously. Therefore, the light guide 28 is removed as is shown in FIG. 3.

Figure 3A:
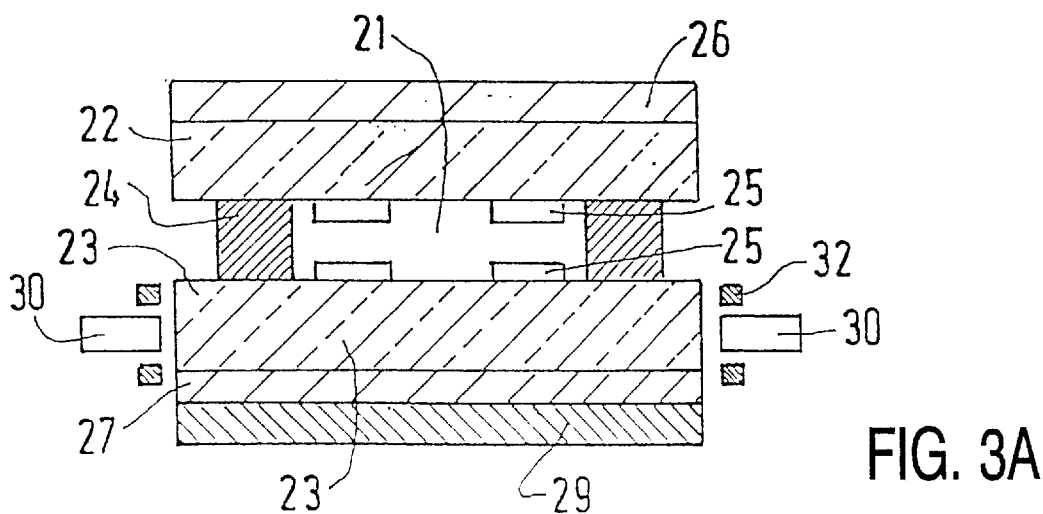
FIG. 3A shows a cross-sectional view of the display of the apparatus shown in FIG. 1

A cross-sectional view of the liquid crystal display represented in FIG. 1 is illustrated in FIG. 3A. The references of the elements which are identical to those of FIG. 2 are maintained. A reflective film 32 is applied along the side perimeter of the lower glass layer 23. Openings in the film are maintained for permitting the light emitted by the source 30 to pass. Preferably, light-emitting diodes are used arranged against the edge of the lower glass layer 23 so as to emit a maximum of light inside the layer. The more the diodes are near to the glass layer, the less the light is reflected on its edge. Possibly, special resins may be used for guiding the light from the diode to the glass layer and thus avoid reflections on the edge.

Figure 3B:
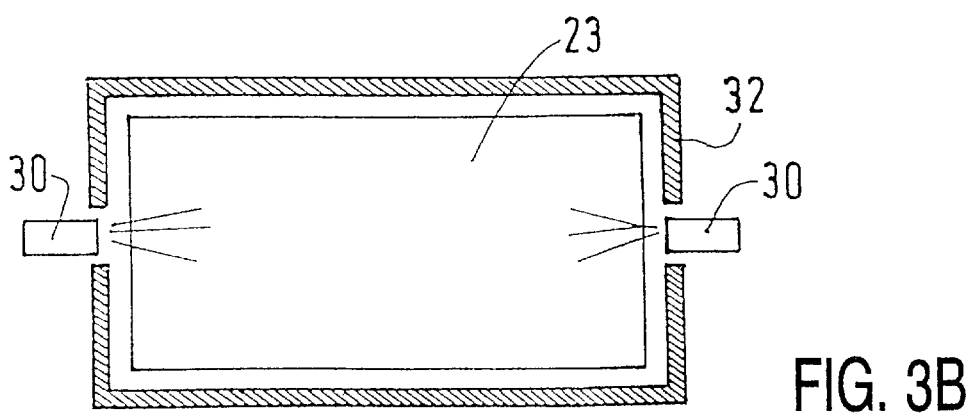
FIG. 3B shows a view according to another section plane of the display shown in FIG. 3A.

A plan view of the assembly of the lower glass layer 23, reflective film 32 and light source 30 is represented in FIG. 3B.

Thus a description has been given of a particularly light and thin display and of an electronic apparatus comprising such a display. Obviously, the invention is not restricted to the embodiments that have just been described and represented. Other variants of embodiment will be clear to the man or woman skilled in the art while these variants do not leave the scope of the invention.

What is claimed is:

1. A display comprising:

a first substrate and a second substrate;

a liquid crystal sandwiched between said first substrate and said second substrate;

a reflective film having at least one opening, said reflective film covering side edges of said first substrate, and said at least one opening providing an at least exposed portion of said side edges; and at least one light source located within said at least one opening to provide light through said a least exposed portion.

2. The display of claim 1, wherein said display does not include an optical waveguide located over said first substrate for receiving said light from said light source.

3. The display of claim 1, wherein said, first substrate and said second substrate are transparent glass.

4. The display of claim 1, further comprising a first polarizer and a second polarizer which sandwich said first substrate and said second substrate, and a reflective layer located over said first substrate.

5. The display of claim 4, wherein said reflective layer is 100% reflective.

6. The display of claim 1, wherein said at least one light source is located near said at least exposes portion to reduce reflected light from said at least exposed portion.

7. An electronic apparatus having a display, said display comprising:

a first substrate and a second substrate;

a liquid crystal sandwiched between said first substrate and said second substrate;

a reflective film having at least one opening, said reflective film covering side edges of said first substrate and said at least one opening providing an at least exposed portion of said side edges; and at least one light source which provides light through said at least exposed portion.

\* \* \* \* \*